US010867208B2

(12) United States Patent
Lamkin et al.

(10) Patent No.: US 10,867,208 B2
(45) Date of Patent: Dec. 15, 2020

(54) UNBIASED FEATURE SELECTION IN HIGH CONTENT ANALYSIS OF BIOLOGICAL IMAGE SAMPLES

(71) Applicant: Government of the United States as Represented by the Secretary of the Air Force, Wright-Patterson AFB, OH (US)

(72) Inventors: Thomas Lamkin, Fairfield, OH (US); Patrick McLendon, Loveland, OH (US); Daniel Cowan, Beavercreek, OH (US); Robert Trevino, Wailuku, HI (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/103,064

(22) Filed: Aug. 14, 2018

(65) Prior Publication Data

US 2019/0332891 A1    Oct. 31, 2019

Related U.S. Application Data

(60) Provisional application No. 62/545,919, filed on Aug. 15, 2017.

(51) Int. Cl.
*G06K 9/62* (2006.01)
*G06K 9/00* (2006.01)
*G01N 15/14* (2006.01)

(52) U.S. Cl.
CPC ....... *G06K 9/6227* (2013.01); *G01N 15/1475* (2013.01); *G06K 9/0014* (2013.01);
(Continued)

(58) Field of Classification Search
CPC ........ G06T 2207/10056; G02B 21/367; G01N 15/1475; G01N 2015/1006; G06K 9/0014;
(Continued)

(56) References Cited

U.S. PATENT DOCUMENTS 9,147,104 B2    9/2015 Adiga et al.
2010/0111396 A1*    5/2010 Boucheron .......... G06K 9/0014
382/133

(Continued)

OTHER PUBLICATIONS

Biesiada et al. "A Kolmogorov-Smirnov Correlation-Based Filter for Microarray Data." International Conference on Neural Information Processing. Springer, Berlin, Heidelberg, 2007. (Year: 2007).*

(Continued)

*Primary Examiner* — Katrina R Fujita
(74) *Attorney, Agent, or Firm* — AFMCLO/JAZ; David Franklin

(57) ABSTRACT

A high content analysis computing system, computer program product and method provides receiving two or more sets of microscopic images of respective sites of selected biological cell assay. Each set of microscopic images comprises one or more images having an aggregate field of view sufficient to encompass all of the cells within the respective site and a resolution sufficient to image cellular bodies within each of encompassed cells. For each set of microscopic images, a library of algorithms is executed that evaluate image features for each cell in each site producing a quantified feature measurement for each cell. Quantified feature measurements are compared for each one of the two or more sets of microscopic images. A subset of the library of algorithms is identified that discriminate at least two of the two sets or more microscopic images and deployed as a computer program product for evaluating additional biological cell assays.

12 Claims, 4 Drawing Sheets

(52) U.S. Cl.
CPC ..... _G06K 9/00147_ (2013.01); _G06K 2209/05_ (2013.01); _G06T 2207/10056_ (2013.01)

(58) Field of Classification Search
CPC ............. G06K 9/00147; G06K 9/6227; G06K 2209/05
See application file for complete search history.

(56) References Cited

U.S. PATENT DOCUMENTS

2014/0064581 A1* 3/2014 Madabhushi ........ G06K 9/6256
382/128
2016/0314335 A1* 10/2016 Al-Kofahi ............ G06K 9/0014

OTHER PUBLICATIONS

Gubler, Hanspeter. "High-throughput screening data analysis." Nonclinical Statistics for Pharmaceutical and Biotechnology Industries. Springer, Cham, 2016. 83-139. (Year: 2016).*

\* cited by examiner

UNBIASED FEATURE SELECTION IN HIGH CONTENT ANALYSIS OF BIOLOGICAL IMAGE SAMPLES

CROSS-REFERENCE TO RELATED APPLICATIONS

This application claims the benefit of priority under 35 U.S.C. § 119(e) to: (i) U.S. Provisional Application Ser. No. 62/545,919 entitled "Biological Sample Image Analysis," filed 15 Aug. 2017; and (ii) U.S. Provisional Application Ser. No. 62/715,304 entitled "High Content Analysis of Biological Image Samples using Medoid Distance" filed 7 Aug. 2018, the contents of which are both incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to testing apparatus and methods of analyzing biological cell-based assays.

2. Description of the Related Art

Cell-based screening is a technology used for exploring normal cellular processes and modulation thereto caused by chemical, infection, and/or genetic changes. Screening has conventionally been a challenge as multiple aspects of experimental biology are performed, including, for example, the preparation of cells, automated microscopy, high throughput screening of large compound libraries, and the development of image analysis and pattern recognition linked to high level bioinformatics databases. These considerations have motivated the development of high content screening methods, which are based on the microscopy of modified host cells to show the activity or organization of molecular targets inside the living cells. Primarily, these techniques have been used for identifying drug candidates for a particular disease or exploring a functional aspect of a given subcellular molecule, including genes, effects of toxins, and material and environmental conditions using statistical analysis.

Conventional workflow for High Content Analysis of images of biological samples presents several challenges. For example, the data set for each experiment are quite large, and new experiments may be continuously performed, amplifying the amount of data. Such large data sets require significant computational power. Moreover, because of the limitations associated with conventional analysis tools, biologists and computer scientists are also needed to fully evaluate a complete data set. Expert knowledge is employed to select a small set of image analysis algorithms that are specifically tailored to measuring microscopic features of a biological cell sample. With increasingly large number of genetic variation and combinations of compounds being compared in a biological cell assay, it becomes difficult if not possible to select a small biased set of feature measuring algorithms that can discriminate between populations in a biological cell assay, even with the aid of automated microscopy and high performance computing.

BRIEF SUMMARY

In one aspect, the present disclosure provides a method for high content analysis of biological cell-based assays. In one or more embodiments, the method includes receiving two or more sets of microscopic images of respective sites of selected biological cell assay. Each set of microscopic images comprises one or more images having an aggregate field of view sufficient to encompass all of the cells within the respective site and a resolution sufficient to image cellular bodies within each of encompassed cells. The method includes, for each set of microscopic images, executing a library of algorithms that evaluate image features for each cell in each site producing a quantified feature measurement for each cell. The method includes comparing quantified feature measurements for each one of the two or more sets of microscopic images. The method includes identifying a subset of the library of algorithms that discriminate at least two of the two sets or more microscopic images. The method includes deploying the subset of the library of algorithms as a computer program product for evaluating additional biological cell assays that are similar to the selected biological cell assay.

In another aspect, the present disclosure provides a computing system having a memory that contains two or more sets of microscopic images of respective sites of selected biological cell assay. Each set of microscopic images comprises one or more images having an aggregate field of view sufficient to encompass all of the cells within the respective site and a resolution sufficient to image cellular bodies within each of encompassed cells. The memory contains a library of algorithms that evaluate image features. A processor subsystem is in communication with the memory to execute a customized cell assay feature test utility to cause the computing system to perform functionality to: (i) for each microscopic image, execute a library of algorithms that evaluate image features for each cell in each site producing a quantified feature measurement for each cell; (ii) compare quantified feature measurements for each cell for each one of the two or more sets of microscopic images; (iii) identify a subset of the library of algorithms that discriminate at least two of the two or more sets of microscopic images; and (iv) deploy the subset of the library of algorithms as a computer program product for evaluating additional biological cell assays that are similar to the selected biological cell assay.

In another aspect, the present disclosure provides a computer program product comprising a computer readable storage device containing program code. The program code on the computer readable storage device, when executed within a processor associated with a device, enables the device to provide the functionality of: (i) receiving two or more sets of microscopic images of respective sites of selected biological cell assay, each set of microscopic images comprises one or more images having an aggregate field of view sufficient to encompass all of the cells within the respective site and a resolution sufficient to image cellular bodies within each of encompassed cells; (ii) for each microscopic image, executing a library of algorithms that evaluate image features for each cell in each site producing a quantified feature measurement for each cell; (iii) comparing quantified feature measurements for each one of the two or more sets of microscopic images; (iv) identifying a subset of the library of algorithms that discriminate at least two of the two or more sets of microscopic images; and (v) deploying the subset of the library of algorithms as a computer program product for evaluating additional biological cell assays that are similar to the selected biological cell assay.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
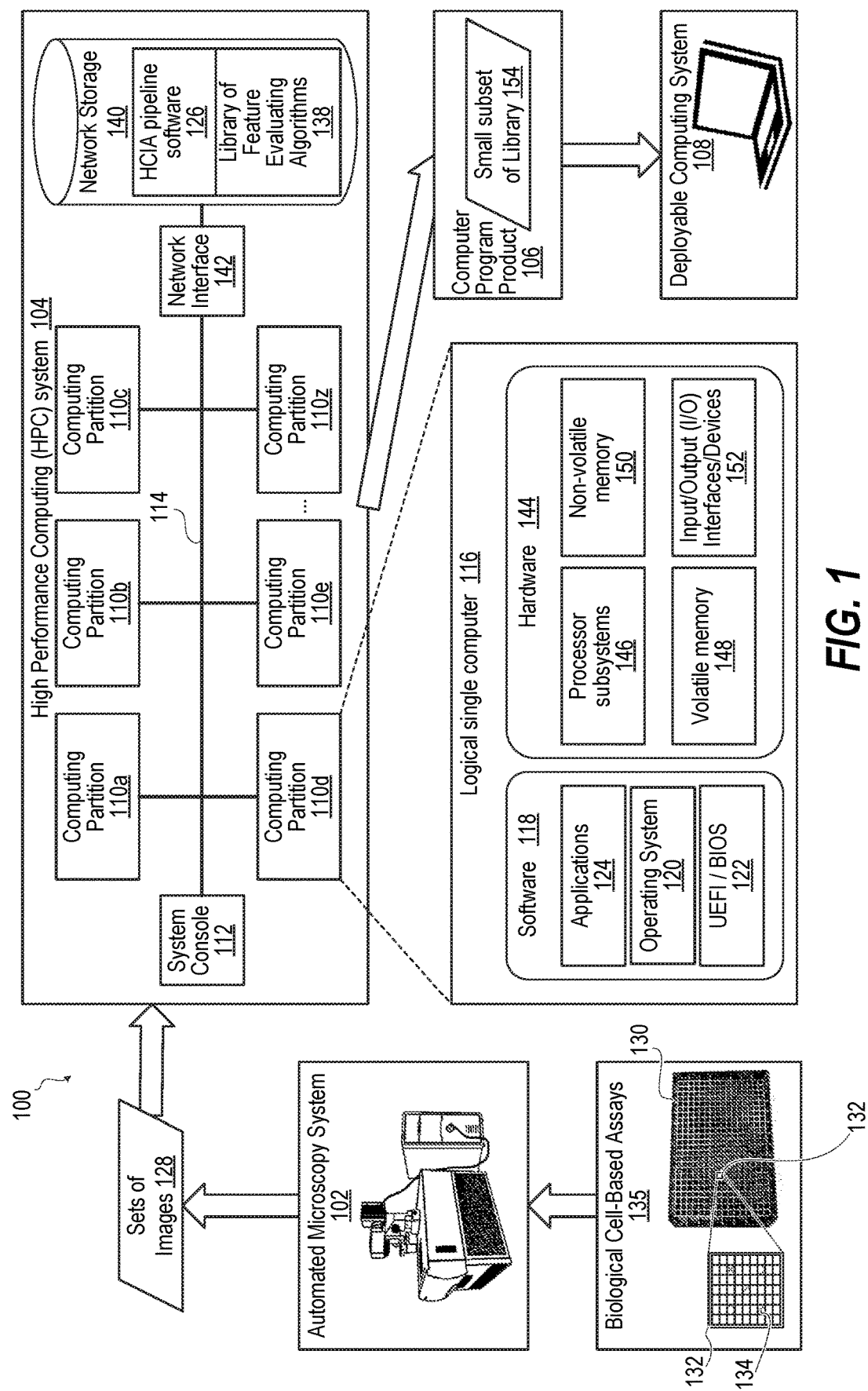
FIG. 1 is a functional block diagram illustrating a high content imaging analysis (HCIA) system for unbiased feature selection customized for a biological cell-based assay, according to one or more embodiments.

A high content analysis computing system, computer program product and method provides receiving two or more sets of microscopic images of respective sites of selected biological cell assay. Each set of microscopic images comprises one or more images having an aggregate field of view sufficient to encompass all of the cells within the respective site and a resolution sufficient to image cellular bodies within each of encompassed cells. For each set of microscopic images, a library of algorithms is executed that evaluate image features for each cell in each site producing a quantified feature measurement for each cell. Quantified feature measurements are compared for each one of the two or more sets of microscopic images. A subset of the library of algorithms is identified that discriminate at least two of the two sets or more microscopic images and deployed as a computer program product for evaluating additional biological cell assays.

Cellular features may be examined by way of microscope or microscopic imaging. For example, bright field microscopy images provide a quick and efficient method of detecting the cells and cellular features. Cellular detection, counting, and classification on bright field images may be automated; however, images of cell populations tend to be low contrast images with uneven illumination, may contain objects with uneven textures, and may include debris and other artifacts, which makes automation difficult. Techniques are employed that automate bright field microscopy imaging, pre- and post-processing of images, and screening of cell populations for investigating phenotypic changes due to chemicals, toxins, infection, genetic alteration, or environmental conditions. U.S. Pat. No. 9,147,104 to Adiga, et al., whose contents are incorporated by reference in its entirety, provides a method of classifying, with a computer processor, at least one feature of cells from a low contrast, digital image. The method includes generating a contrast-enhanced image by applying a high-pass filter to the low contrast, digital image. The contrast-enhanced image is smoothed with a first low pass filter. A background image, generated from the low contrast, digital image, is subtracted from the smoothed, contrast-enhanced image to form an analysis image. The at least one feature is identified in the analysis image.

High Content Analysis (HCA) is a combination of automated microscopy (both fluorescence and phase contrast/brightfield) and quantitative image analysis to produce multiparametric cell-level data. HCA provides more data, more statistical power, and more reliability. A typical HCA workflow can include: (i) cell assay; (ii) image acquisition; (iii) image preprocessing; (iv) cell segmentation; (v) feature measurement; (vi) feature selection; and (vii) bioinformatics. Preparation of the cell assays includes use of fluorescent stains, dyes, and tagged proteins/antibodies. Sample dose titrations are created along with negative and positive controls and placed in sites in each well of a well plate or perhaps multiple plates. For example, each well of a 384 well plate can have 63 sites per well. In other embodiments, the arrangement of items to be imaged can vary in many numbers and configurations. The number of sites per well is dependent on factors such as the particular type of microscope being used, the magnification level chosen, the required resolution for the subject matter, limitations on estimated file size, the experiment structure of number of populations represented in the cell assay, etc. Automated microscope obtains high resolution microscopic images that are stored in high-capacity data storage. High/super performance computing system performs the quantitative image analysis using algorithms that measure 11,000 features for each and every cell. Features measured include (i) basic size and shape descriptors; (ii) texture; (iii) granularity, and shading; (iv) intensity; (v) cell boundary and edge features; (vi) heuristic features (e.g., spottiness, X2 distance); (vii) entropy; (viii) Haralick (i.e., relative grey); and (ix) angular momentum.

HPC supports "big data" that is generated by HCA. For example, a 16-bit .tif image is about 2.8 MB. Up to 5 images are collected per site. Up to 63 sites per well are imaged at 20× magnification. If 4 images are collected at 5 sites/well, 7,680 images of 21.5 GB are then taken resulting in 23 GB of HCA data that can be compressed to 6 GB. If 4 images are collected at all 63 sites/well, 96,768 images of 271 GB result, which becomes 290 GB of HCA data that can be compressed to 75.6 GB. The large amount of data with large sets of images for each experiment means significant computation for feature analysis. A system is required to aid a biologist in performing HPC parallel data analytics.

A software tool referred to as Clarity Bioanalytics provides data management of projects (create, view or edit) and utilities (upload images, upload assay plate maps, view/edit data dictionary settings, search for compounds across all plates, upload compound plate maps). The software tool also supports analysis and reporting. Therefore, the software tool addresses big data problems requiring sophisticated analytics solutions such as large-scale genome-wide biological experiments. The software tool is a multiplexed analysis tool that, coupled with the power of HPC, brings large-scale data analytics into routine use such as being aimed at using morphological feature measurements of genetically characterized cells to predict toxicological profiles based on phenotype-genotype associations.

According to aspects of the present disclosure, unbiased feature selection is addressed. The goal of feature selection is to identify the subset of features that best uniquely discriminates between two populations, such as a treatment and a control. This list of selected features should be as useful as possible in differentiating the populations, as unique as possible in terms of not containing redundant features, and contain as few features as possible for best performance.

The feature measurement stage of the pipeline calculates 11,000 unique features for every cell in the assay images. Depending on the nature of the experiment, some of those features may contain largely noise, some may be largely uniform, yet other features contain values that significantly differ between two populations of cells, such as between an untreated control population and a population exposed to a drug. It is those features the system identifies as the most useful features.

Some of the features that usefully discriminate between the two populations may be measuring morphologies that are very similar to each other under the current experiment conditions. In the cases where two or more features are highly correlated, only one representative feature is included in the final feature list. This is both to reduce downstream processing burdens as well as to prevent a group of correlated features from "drowning out" a solitary feature during later analysis.

Many different algorithms could potentially be used to perform the feature selection task. According to one or more aspects of the present disclosure, the primary algorithms currently used are an evaluation filter based on the two sample Kolmogorov-Smirnov test (KS test) followed by a correlation filter based on the Pearson correlation coefficient.

The KS test compares two samples and can be used to determine whether those samples are significantly different. The algorithm takes the values for a single feature across all the cells in each population and calculates the KS statistic (D) for that feature. The two samples are considered to be significantly different if that KS statistic is greater than the critical D value which is calculated based on the size of the samples and the desired confidence level.

In statistics, the Kolmogorov-Smirnov test (K-S test or KS test) is a nonparametric test of the equality of continuous, one-dimensional probability distributions that can be used to compare a sample with a reference probability distribution (one-sample K-S test), or to compare two samples (two-sample K-S test). It is named after Andrey Kolmogorov and Nikolai Smirnov. The two-sample K-S test is one of the most useful and general nonparametric methods for comparing two samples, as it is sensitive to differences in both location and shape of the empirical cumulative distribution functions of the two samples.

The Kolmogorov-Smirnov statistic quantifies a distance between the empirical distribution function of the sample and the cumulative distribution function of the reference distribution, or between the empirical distribution functions of two samples. The null distribution of this statistic is calculated under the null hypothesis that the sample is drawn from the reference distribution (in the one-sample case) or that the samples are drawn from the same distribution (in the two-sample case). In each case, the distributions considered under the null hypothesis are continuous distributions but are otherwise unrestricted.

The empirical distribution function $F_n$ for n independent and identically distributed (iid) ordered observations $x_i$ is defined as $$F_n(x) = \frac{1}{n} \sum_{i=1}^{n} I_{[-\infty, x]}(X_i) \tag{Eqn. 1}$$

where $I_{[-\infty, x]}(X_1)$ is the indicator function, equal to 1 if $X_i \leq x$ and equal to 0 otherwise. The Kolmogorov-Smirnov statistic for a given cumulative distribution function F(x) is $$D_n = \sup_x |F_n(x) - F(x)| \tag{Eqn. 2}$$

where $$\sup_x$$

is the supernum of the set of distances.

To calculate the KS scores for a plate, all the wells are taken from population 1 (e.g. A1, A2) and all the wells from population 2 (e.g. B1, B2) and then do pairwise KS tests for each combination of wells (e.g. A1-B1, A1-B2, A2-B1, A2-B2). The average KS statistic is computed across all these well combinations and is used as the final D score for that feature on that plate. This process is repeated for each of the 11,000 features to give a score for each feature. All features with a score greater than the critical D score would be considered significant features for that plate.

For large experiments performed across multiple plates, the per-plate KS tests are first performed as described above. Then for each feature the number of plates are counted that it was found to be statistically significant (above the critical D). The final feature list is composed by including all features that were significant in a certain percentage of plates (e.g. >90% of the plates).

Removal of redundant features from the final feature list is done by applying a filter based on the Pearson correlation coefficient. In statistics, the Pearson correlation coefficient (PCC), also referred to as Pearson's r, the Pearson product-moment correlation coefficient (PPMCC) or the bivariate correlation, is a measure of the linear correlation between two variables X and Y. It has a value between +1 and −1, where 1 is total positive linear correlation, 0 is no linear correlation, and −1 is total negative linear correlation. Pearson's correlation coefficient is the covariance of the two variables divided by the product of their standard deviations. The form of the definition involves a "product moment", that is, the mean (the first moment about the origin) of the product of the mean-adjusted random variables; hence the modifier product-moment in the name.

The correlation of the feature values are calculated for every pair of features across our populations. If two features are highly correlated (with Pearson correlation coefficient above a certain threshold), the feature with the higher D score as calculated by the KS test is kept and the feature with the lower D score is removed. The feature pairs are tested in descending order by D score and are only compared with features that have already been selected to "keep". This efficiently filters out redundant features while keeping the most discriminatory feature from sets of correlated features.

To apply the correlation filter across multiple plates, a process similar to the KS test is performed, where the features are chosen that passed the correlation filter in a certain percentage of the plates (e.g. 90%). The two lists of features are then combined by taking only the features that both appeared in the final KS list and the final correlation list to produce a final list. The final list provides informative, unique features for the experiment populations under consideration. The relatively small number of features enable deployment on low to moderate computing platforms that are usable in wide range of clinical and research settings at an economical price. HPC capabilities can be directed to customizing sets of features for other experiment populations.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 schematically shows a logical view of an exemplary high content image analysis (HCIA) system 100 that combines automated miscropy from an automated microscopy system 102 and quantitative image analysis by a high performance computing (HPC) system 104 to produce multiparametric cell-level data. In particular, the HPC identifies a set of image feature evaluating algorithms in an unbiased manner from a large number of high content images received from the automated miscropy system 102. The set is tailored to discriminate closely associated populations within a biological cell-based assay. The set is also reduced to an essential number of algorithms to enable use as a computer program product 106 executed on a deployable computing system 108 of modest computational capacity. Deployable computing system 108 can be used to do the same testing on similar biological cell-based assays.

HPC system 104 includes a large amounts of memory or data storage, and large numbers of (or extremely fast) memory accesses or computational operations. The HPC system 104 includes a number of logical computer partitions 110a-z for providing computational resources, and a system console 112 for managing the plurality of partitions 110a-z. Partitions 110a-z may communicate with the system console 112 using a logical communication network 114. A system user, such as a scientist or engineer who desires to perform a calculation, may request computational resources from a system operator, who uses the system console 112 to allocate and manage those resources. The HPC system 104 may have any number of computer partitions 110a-z that are administratively assigned, and often has only one partition that encompasses all of the available computer resources. Accordingly, this figure should not be seen as limiting the scope of the disclosure.

Each computer partition 110a-z, such as a computer partition 110d, may be viewed logically as if it were a logical single computer 116, akin to a desktop computer. Thus, the computer partition 110e may execute software 118 in volatile, non-volatile programmable, or fixed media. Software 118 can include a single operating system ("OS") instance 120 that uses a Unified Extensible Firmware Interface (UEFI) or a basic input/output system ("BIOS") 122 as these are used together in the art, and application software 124 for one or more system users. System console 112 can divide an intensive amount of computing requirements for a high content image analysis (HCIA) pipeline program 126 used on sets of images 128 received from automated microscopy system 102. Sets of images 128 are generated from one or more well plates 130, which for example can include 16×24 (384) wells 132 with each well 132 having 7×9 (63) sites 134. The one or more well plates 130 contain a biological cell-based assay 135 that is prepared for imaging. Some or all of the sites 134 contain biological cell-based assays. Particular image processing algorithms for certain ones of the set of images 128 are assigned by the system console 112 to a respective logical single computer 116. The sets of images 128 and HCIA pipeline software 126 including a library 138 of feature evaluation algorithms can be stored in network storage 140 for use by any of the computer partition 110a-z via network interface 142. Feature evaluation algorithms are used to measure 11 k+ features of every cell including: (i) basic size and shape descriptors; (ii) texture, granularity, shading; (iii) intensity; (iv) cell boundary, edge features; (v) heuristic features such as spottiness and $X^2$ distance; (vi) entropy; (vii) Haralick (relative grey); and (viii) angular momentum.

Each computer partition 110a-z has various hardware 144 allocated to it by a system operator via system console 112, including one or more processor subsystems 146, volatile memory 148, non-volatile storage 150, and input/output (I/O) interfaces/devices 152 (e.g., network ports, video display devices, keyboards, and the like). However, in HPC systems 104 like the implementation in FIG. 1, each computer partition 110a-z has a great deal more processing power and memory than a typical desktop computer. By contrast, the deployable computing system 108 has a much smaller processing capacity. HPC system 104 provides the computer program product 106 including a small subset 154 of the library 138 enabling the one or more deployable computing systems 108 to provide research or clinical testing capabilities for the same or similar type of biological cell-based assays without having to run the full battery of algorithms. Yet, the small subset 154 of the library 138 provides a highly discriminatory capability even between the same compound test on closely related genetic subjects or closely related compounds tested on the same genetic subject. Regardless of the computing capability of deployable computing system 108, the small subset 154 omits closely correlated features that could shift the characterization of the image away from other features by weighting the result.

Figure 2:
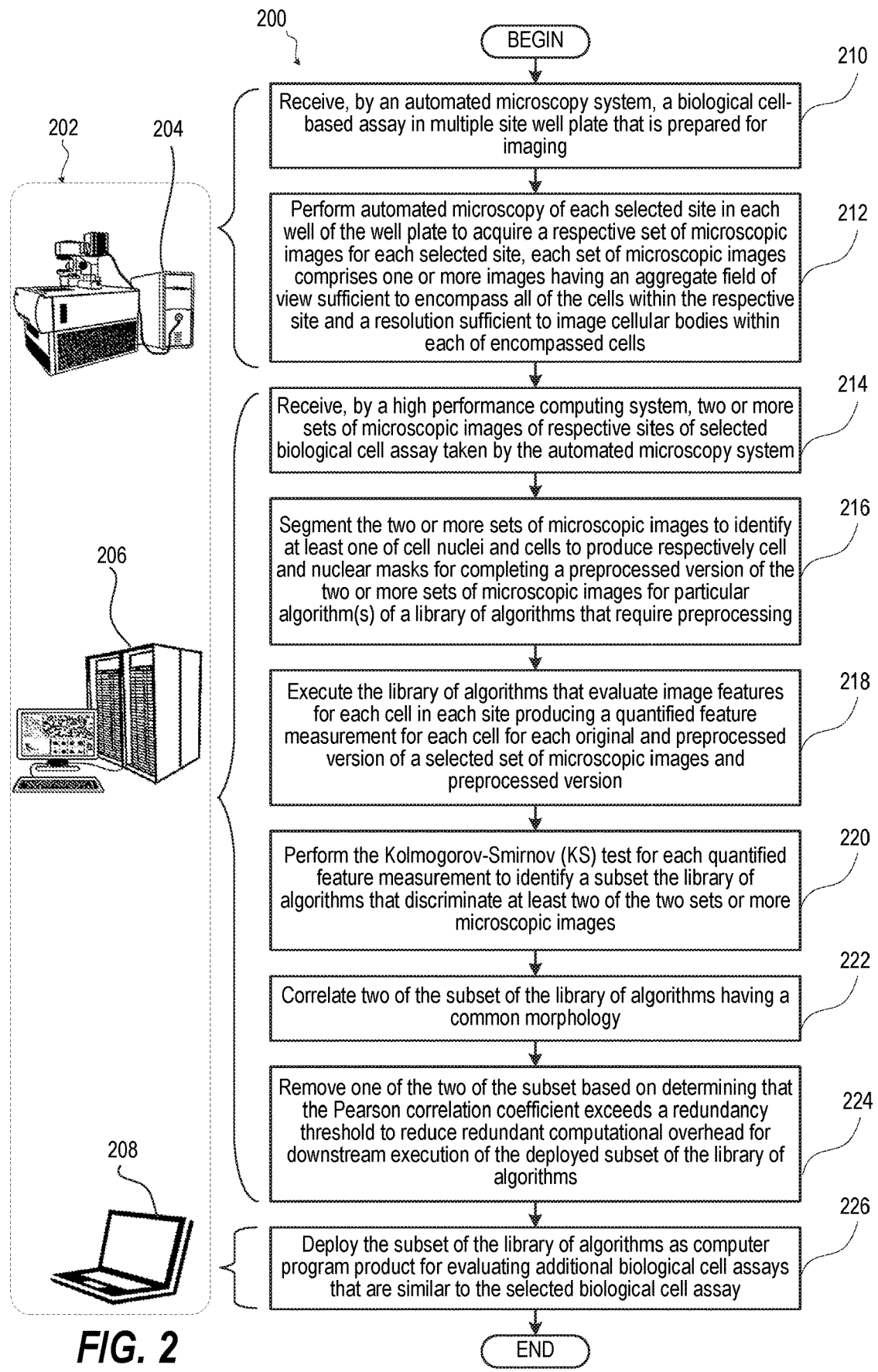
FIG. 2 is a flow diagram illustrating a method of high content analysis of biological samples by an analysis system, according to one or more embodiments.

FIG. 2 is a flow diagram illustrating a method 200 of high content analysis of biological samples by an analysis system 202, which in an exemplary embodiment is represented by sequential contributions by automated microscopy system 204, a high performance computing system 206, and a deployable computing system 208. In one or more embodiments, method 200 includes receiving, by an automated microscopy system, a biological cell-based assay in multiple site well plate that is prepared for imaging (block 210). Method 200 includes performing automated microscopy of each selected site in each well of the well plate to acquire a respective set of microscopic images for each selected site. Each set of microscopic images comprises one or more images having an aggregate field of view sufficient to encompass all of the cells within the respective site and a resolution sufficient to image cellular bodies within each of encompassed cells (block 212). Method 200 includes receiving, by a high performance computing system, two or more sets of microscopic images of respective sites of selected biological cell assay taken by the automated microscopy system (block 214). Method 200 includes segmenting the two or more sets of microscopic images to identify at least one of cell nuclei and cells to produce respectively nuclear and cell masks for completing one or more preprocessed versions of the two or more sets of microscopic images for particular algorithm(s) of a library of algorithms that requires preprocessing (block 216). Method 200 includes executing a library of algorithms that evaluate image features for each cell in each site producing a quantified feature measurement for each cell for each original and preprocessed version of a selected set of microscopic images and preprocessed version (block 218). Method 200 includes performing the Kolmogorov-Smirnov (KS) test for each quantified feature measurement to identify a subset of the library of algorithms that discriminate at least two of the two sets or more microscopic images (block 220). Method 200 includes correlating two of the subset of the library of algorithms having a common morphology (block 222). Method 200 includes removing one of the two of the subset based on determining that the Pearson correlation coefficient exceeds a redundancy threshold to reduce redundant computational overhead for downstream execution of the deployed subset of the library of algorithms and prevents correlated features from drowning out other features (block 224). Method 200 includes deploying the subset of the library of algorithms as a computer program product for evaluating additional biological cell assays that are similar to the selected biological cell assay (block 226). Then method 200 ends.

Figure 3:
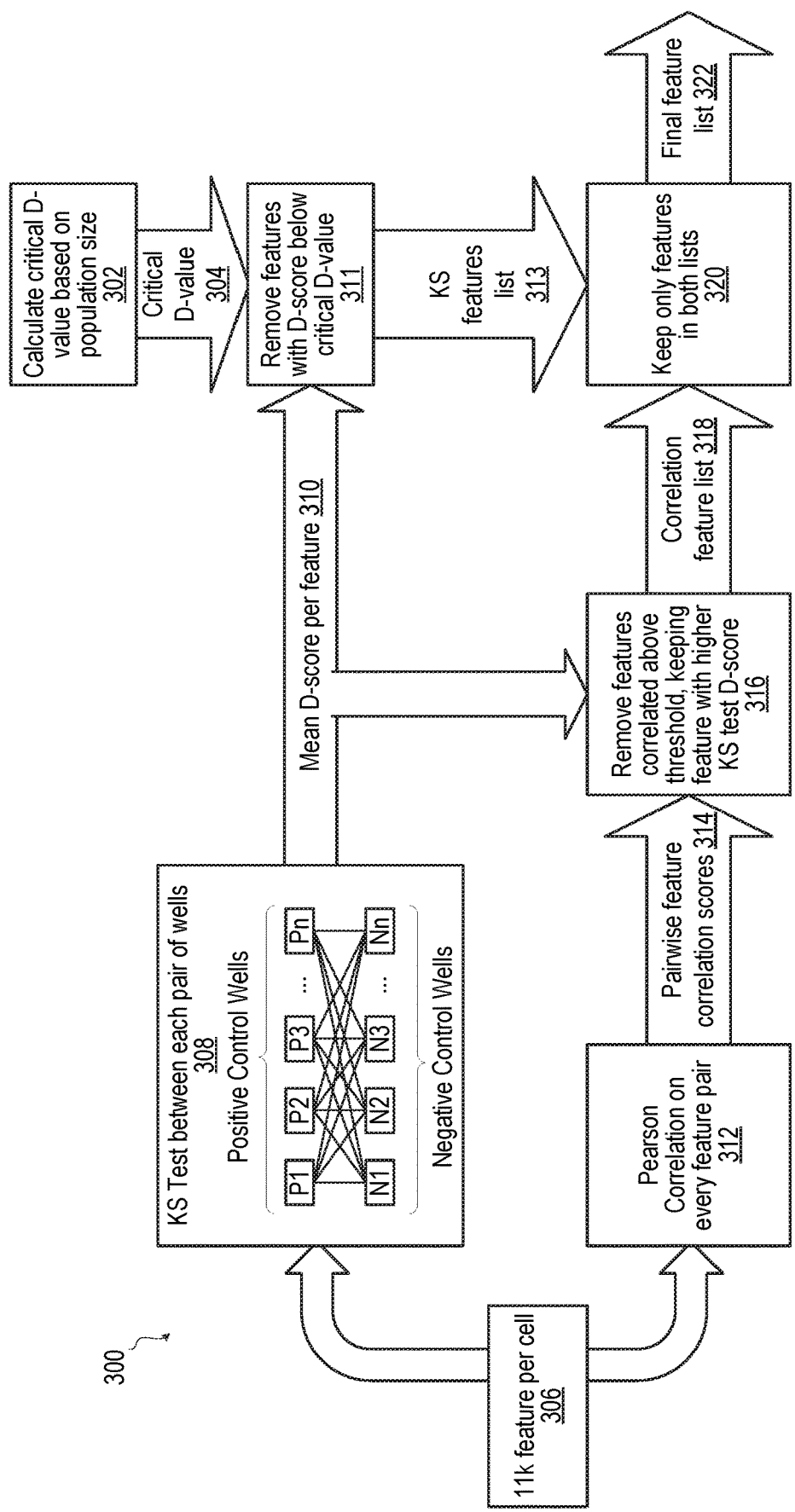
FIG. 3 is a block diagram illustrating a processing method of performing feature selection, according to one or more embodiments.

FIG. 3 is a block diagram illustrating a processing method 300 of performing feature selection, according to one or more embodiments. Method 300 begins with calculating critical D-value based on population size (block 302). Block 302 results in a critical D value 304. In addition, method 300 includes processing each cell in each image with 11,000 feature evaluation algorithms (block 306). Method 300 includes processing with the feature evaluation results with a KS test between each pair of positive control wells {P1, P2, P3, . . . , Pn} and negative control wells {N1, N2, N3, . . . , Nn} (block 308). Block 308 produces mean D-score per feature 310. Critical D-value 304 is used to remove feature with D-score below critical d-value (block 311), producing KS features list 313. Pearson correlation on every feature pair is performed based on the 11,000 feature evaluation results for each cell of each image (block 312). Block 312 results in pairwise feature correlation scores (block 314). Based on mean D-score per feature (block 310) and pairwise feature correlation scores (block 314), method 300 includes removing features correlated above a threshold by keeping the feature of correlated pair of features that has the higher KS test D-score (block 316). Block 316 results in correlation feature list 318. Based on critical D value 304 and correlation feature list 318, method 300 includes keeping on features that are found in both lists (block 320). Block 320 results in final feature list 322. Then method 300 ends.

Figure 4:
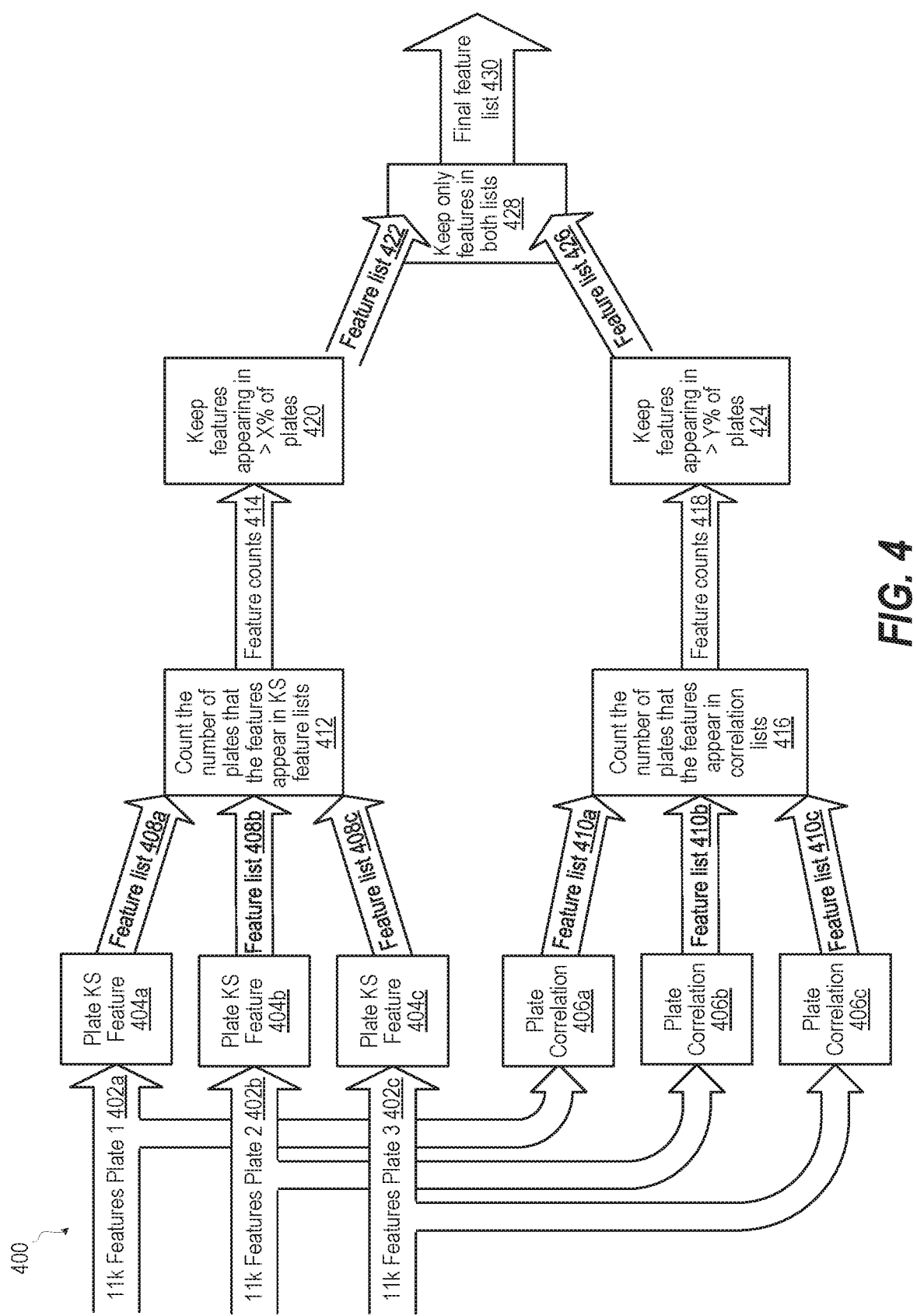
FIG. 4 is a block diagram illustrating a processing method for analyzing multiple well plates of a cell-based assay, according to one or more embodiments.

FIG. 4 is a block diagram illustrating a processing method 400 that builds upon method 300 (FIG. 3) for analyzing multiple well plates of a cell-based assay, according to one or more embodiments. For clarity, three well plate testing is illustrated, although the number of well plates can be two or more than three. For each plate 1 3, 11,000 features are evaluated for each cell of each image (blocks 402a c). The results are respectively processed by a plate KS feature calculator (blocks 404a c) and a plate correlator (blocks 406a c), each producing a respective feature list 408a c, 410a c. Method 400 includes counting the number of plates that appears appear in KS feature lists 408a c (block 412). Block 412 produces first set of feature counts 414. Method 400 includes counting the number of plates that appears appear in correlation lists 410a c (block 416). Block 412 produces a second set of feature counts 418. Method 400 includes keeping features in the first set of feature counts 414 having a count that appears in more than a first threshold (X %) of plates (bock 420). Block 420 produces a first filtered feature list 422. Method 400 includes keeping features in the second set of feature counts 418 having a count that appears in more than a second threshold (Y %) of plates (bock 424). Block 424 produces a second filtered feature list 426. Based on first and second filtered feature lists 422, 426, method 400 includes keeping only features that are in both lists (block 428). Block 428 produces final feature list 430. The method 400 ends.

In an exemplary use, methods 200, 300, 400 are used in analyzing genetic risk variation in cellular response to chemical substances. Protecting the health of military operators involves assessing, treating, and developing countermeasures to illness, injury, or exposure to foreign substances commonly encountered in harsh and varied environments. A complicating factor in this is the wide range of responses that exist for every treatment or exposure due to underlying differences in each person's genetic profile. Understanding how genetics influences response to chemical exposure is critical for advancing personalized medicine and the Air Force's Total Exposure Health (TEH). We therefore propose to develop a high content analysis (HCA) assay utilizing a diverse panel of genetically characterized cell lines exposed to known toxic chemicals or pharmaceutics to identify the specific genetic polymorphisms that correlate with differential phenotypic responses. This work will feed into personalized medicine and the Air Force Surgeon General's TEH strategic initiative by creating a knowledge base and analytical tools to address uncertainty in the risk assessment and hazard mitigation processes. These will be critical to make biological meaning out of the myriad of data that will pour in as we collect more information about operational exposures through the advances in TEH and are a critical step in applying TEH to personalized medicine.

In the exemplary use, TABLE 1 provides the toxic compound panel:

TABLE 1

| Compound | Mechanism of Action |
| --- | --- |
| 4-aminophenol (4AP) | Inhibits DNA synthesis; general toxicant |
| Mitoxantrone (MTX) | Inhibits DNA synthesis; DNA intercalator |
| Nocodazole (NOC) | Spindle poison |
| Etoposide (ETP) | Topoisomerase II inhibitor |
| 5-Fluorouracil (5FU) | Inhibits DNA synthesis |
| Methotrexate (MTHX) | Inhibits dihydrofolate reductase |
| Paroxetine (PAR) | Selective serotonin reuptake inhibitor |
| Rotenone (ROT) | Disrupts mitochondrial e-transport chain |
| Oxaliplatin (OXP) | Inhibits DNA synthesis; DNA crosslinker |

Chemical toxins and pharmaceutical agents with diverse mechanisms of action were acquired from Sigma-Aldrich as dry stocks, diluted in DMSO, and stored at −20° C. Each compound was prepared in an 8-to 10-point serial dilution and aliquoted in a 384-well polypropylene V-bottom plate.

Cell-based screening assay: Human B-lymphoblast cell lines (LCLs) transformed with Epstein-Barr virus were acquired from Coriell Biorepositories. All LCLs were part of the HapMap and/or 1000 Genomes projects and were genetically characterized by single nucleotide polymorphism (SNP) array scanning or next generation sequencing, respectively. SNP data for LCLs were downloaded from the dbSNP repository (www.ncbi.nlm.nih.gov/SNP). After removal from cryogen storage, LCLs were cultured for 2 weeks in RPMI 1640 supplemented with 15% fetal bovine serum and 1% penicillin/streptomycin. Cells were passaged every 3-4 days to maintain cells in exponential growth.

Cells were treated with each dose of compound at a final dilution of 1:1000 in a 96-well round-bottom culture plate (~50,000 cells/well). Cell densities were adjusted based on the doubling times of each LCL. As internal on-plate controls, Jurkat cells treated with vehicle control (0.1% DMSO), 10% DMSO, or a single mid-range dose of 4 different compounds (to elicit ~50-80% cell death) were always included in the last column. Cells were incubated (48 hours) with compounds and then centrifuged, washed twice with PBS, and then stained simultaneously with Hoechst (nuclear stain) and eFluor 660 far red viability stain in PBS for 30 minutes. The stains were then aspirated and the cells resuspended in cell culture media and aliquoted (50 μL) in quadruplicate in 384-well low-bottom Cell Carrier plates. The cells were centrifuged at 2000 rpm (5 minutes) and then imaged at 4 sites/well collecting phase contrast (whole cell) and fluorescent images (377/477 nm, 628/692 nm excitation/emission). Images were processed by HCA using the in-house developed pipeline CLARITY BIOANALYTICS. Negative control LCLs were treated with 0.1% DMSO. LCLs were treated with 3.3 μM rotenone such that blue (Hoechst 33342) indicates the nucleus and red (eFluor660) marks dead cells. High content imaging of LCLs was performed.

KS Feature Evaluation: The performance of all 11,000 high content features was individually analyzed using a Kolmogorov-Smirnov (KS) test to rank and score each feature's ability to discriminate between Negative control populations and mid-high dose wells of each compound. A Pearson correlation filter was also applied to remove features that were highly correlated with each other (correlation value >0.85). The critical D value (Dcrit) indicates the value above which a feature is significant (95% CI). Features were rank ordered and separated by the number of compounds for which each feature was selected. Compound-specific features were rank ordered for each compound.

According to the present innovation, a work flow was performed to identify genetic linkage. HCA results for all LCLs are clustered. LCL clusters differing from the norm are used to guide SNP profile segregation. SNP profiles for LCLs with abnormal phenotypic response are used for both multivariate genome wide association (GWA) studies and pathway analysis. The results provide QTLs, genes, and pathways correlating to the differential phenotypes of the LCLs.

The present innovation includes development of a robust HCA assay using human LCLs and a representative panel of chemical toxicants. Image analysis and processing using the automated HCA pipeline have demonstrated that certain subsets of morphological features are informative for detecting toxic phenotypes in general, while other features are able to identify toxicant-specific phenotypes. Present disclosure provides a methodology for using phenotypic clustering and other machine learning algorithms for informing our GWA and pathway analysis studies with the end goal of identifying genomic linkages to variable response to chemical exposure.

After the initial proof of concept study, additional analysis performed examine additional toxicants with varying mechanisms of action. Additional LCLs will also be examined to improve study power. The methodology leads to a predictive tool that is created to utilize the database of genetic linkages discovered as part of this project combined with chemical topological fingerprints (in connection with in silico chemical libraries) and external toxicological databases. The tool analyzes genetic sequence data and report on potential chemical susceptibility or resistance for an individual.

Defining Toxin Resistance—A Study in Genome-Wide Toxicogenomic High-Content Analysis provides an illustrative use of aspects of the present innovation. A library of 11,002 algorithms was used to ascertain features from images of 82 different cell treatments. 9 compounds at various concentrations, as well as negative and positive controls. 229 cell lines (across ~700 plates). The goals were to (1) prove that these features show a signal—that IC50 concentrations can be classified versus negative controls for each cell line, (2) prove that the whole feature set can be reduced utilizing dimension reduction procedures, (3) prove that following these procedures, there is no significant degradation in classification, (4) utilize a novel metric—medoid distance—to find the "difference" between the IC50 concentration and the negative control per each cell line, and (5) analyze SNPs in these cell lines to compare cell line resistance and susceptibility to the toxin treatments A maximum number of plates and cells to be representative was determined. Features with missing or zero values (MVR) and with low variance (LVF) were eliminated. The feature sets to ensure that the different clusters exist, before and after feature reduction were classified. Components from correlated features (HCF) were created. Medoid values for negative control clusters and IC50 clusters for each cell line were determined along with the medoid distance between these medoids. Histograms of medoid distances for each toxin for every cell line, such as etoposide medoid distances between IC50 and negative control clusters for all 229 cell lines were created and significant cutoffs depending on histogram distribution to call "susceptible" or "resistant" cell lines were determined. Medoid distance values were run through MAGWAS to determine connection to various SNPs. The set of SNPs were analyzed to determine correlation to susceptibility or resistance.

Medoid distances were obtained for etoposide (right) using MVR, LVF, and HCF. Larger medoids represent cell lines that look "more alive" while smaller medoids are cell lines that look "more dead." These medoids were utilized in MAGWAS to produce a list of SNPs at an alpha value of 0.0001.

Using closest features analytics, four significant SNPs were detected, two of which had been characterized and previously published in relation to etoposide. These were located in the intronic regions of DHRS3 (dehydrogenase/reductase 3) and C1orf141 (chromosome 1 open reading frame 141). Overexpression of DHRS3 is a regulator of lipid metabolism in cancer and C1orf141 which is related to the transcription factors POU2F1 and OCT1, both of which have been previously published in relation to Topoisomerase II, the main mechanism of action related to etoposide.

It appears that not only are particular features correlated to general toxin resistance and susceptibility, but also that some are correlated to particular toxins. Utilizing MAGWAS to analyze these differences has provided us with several candidate SNPs to test in vitro for validation. Ultimately, it is our hope that we may take images of cells and ultimately deduce accurate phenotypes, without the time and computational constraints seen in whole-genome sequencing. Novel Watershed Algorithm for Flexible Cell Segmentation in MATLAB: The first step in high throughput cell imaging studies is automatic cell segmentation. Both the CLARITY BIOANALYTICS project in USAF SAM and the MEH project in the Airman Systems Directorate rely on accurate cell segmentation algorithms in their pipeline. With CLARITY BIOANALYTICS looking to move to new cell types, and the MEH project just ramping up, both projects were looking for new approaches to cell segmentation. Algorithms explored include Sobel edge detection, windowed adaptive thresholding, and marker-based watershed segmentation.

While cell segmentation techniques vary from task to task, marker-based watershed techniques are commonly used and widely accepted in very different areas of image analysis. Steps had to be taken to produce a marker-based watershed algorithm that is an improved approach for cell segmentation over a generally-known a MATLAB watershed algorithm.

The present disclosure provides for performing several operations in preprocessing the images: (1) Identify Nuclei: The cells in both studies generally have one nucleus per cell. Additionally, a nuclear stain makes these nuclei easily separable from the rest of the cell. These factors make the nucleus an excellent marker for the watershed. Using only the wavelength for the nuclear stain, a windowed adaptive threshold converts the image into black and white (1=nucleus present, 0=no nucleus). (2) Windowed Adaptive Threshold: This novel approach overcomes the existence of "light" and "dark" areas in an image, and uses Otsu's thresholding method. (3) Cell Masking: Originally done using the windowed adaptive threshold method, this is now done using a dilated Sobel edge detector. The edge detector locates regions of dramatic change in the image, then dilates to fill in any gaps. The generally-known watershed algorithm is a widely used image processing technique that has been applied across all areas of computer vision. The basic principle is to treat the image as a topographic map, where the value of each pixel represents its height. The border between two adjacent objects lies along the ridge separating them. MATLAB's built-in watershed function takes a grayscale image, and treats every valley as a seed point (i.e. if there was a lake on the top of a mountain, it would count the lake as its own object, rather than including it as part of the mountain). The watershed algorithm developed according to the present disclosure instead begins at specified seed points (nuclei), and fills out around them iteratively. The novel watershed algorithm displays improved flexibility over existing methods. The generally-known segmentation technique assumes that the cells are relatively round, but it is clear the proposed technique does not make any such assumptions.

Early versions of the novel watershed algorithm were not perfect, however. The major issues come from the masking rather than the watershed algorithm; the edge detection approach to cell masking creates a loose perimeter, and the windowed threshold technique often groups nuclei together. These issues can be overcome by taking an iterative approach to filling out the basins, resulting in a watershed algorithm that made much more useful and flexible.

Hierarchical Clustering of Features: According to the present disclosure, the CLARITY BIOANALYTICS Pipeline is an image analysis project. Images of cells are taken and analyzed to produce 11,000 features. One aspect of the pipeline is reducing these original 11,000 features to a more manageable and manipulatable dataset. Hierarchical clustering and generation of heat maps serve to supplement and validate this feature reduction process.

Data from the h5 file (a highly structured file format that can store large amounts of data) was extracted. Python has a library for reading accessing h5 files. Specific wells were selected and the plate treated with nine toxins and a positive and negative control (DMSO). There are thirty-two wells for each toxin and control. Each toxin is analyzed separately. Specific features were selected and depended on the selected toxin and wells. The data was then transformed, clean up, and normalized. A z-score (the number of standard deviations a data point is away from the mean) was determined along each feature. Data was hierarchically clustered and included grouping of data into clusters and then forms hierarchies from these clusters. Python has a library that implements a hierarchical clustering algorithm. This algorithm was used to cluster both the wells and features. The output of this algorithm is a linkage matrix that can be used to make a dendrogram. A dendrogram is a graphical representation of hierarchical clustering.

The results of the hierarchical clustering yielded heat maps that displayed distinct groupings of z-scores. Each column (feature) has only a few distinct clusters of high-z score values. This may indicate that the feature is useful in determining differences among the phenotypes of wells. Although the groupings are distinct, the data did not group as expected. The wells were expected to cluster according to dosage level, and while the positive and negative controls were clustered perfectly, the toxins were not. This could denote a problem with the feature selection.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

The invention claimed is:

1. A method comprising:
receiving two or more sets of microscopic images of respective sites of selected biological cell assay, each set of microscopic images comprises one or more images having an aggregate field of view sufficient to encompass all of the cells within the respective site and a resolution sufficient to image cellular bodies within each of encompassed cells;
for each set of microscopic images, executing, by a high performance computing (HPC) system, a library of algorithms that evaluate image features for each cell in each site producing a quantified feature measurement for each cell;
comparing, by the HPC system, quantified feature measurements for each one of the two or more sets of microscopic images;
identifying, by the HPC system, a subset of the library of algorithms, executable by a deployable computing system, by performing the Kolmogorov-Smirnov (KS) test for each quantified feature measurement that discriminate at least two of the two sets or more microscopic images, wherein the deployable computing system cannot feasibly produce the quantified feature measure for each cell using the library of algorithms;
correlating two of the subset of the library of algorithms having a common morphology by determining a correlation between each pair of algorithms in the subset using the Pearson correlation coefficient;
removing one of the two of the subset having the common morphology based on determining that the Pearson correlation coefficient exceeds a redundancy threshold to reduce redundant computational overhead for downstream execution of a deployed subset of the library of algorithms and to prevent over emphasizing results of correlated features that diminish results of other features; and
deploying the subset of the library of algorithms as a computer program product executable by the deployable computing system for evaluating additional biological cell assays that are similar to the selected biological cell assay.

2. The method of claim 1, wherein removing the one of the two of the subset comprises executing a fast correlation-based filter algorithm.

3. The method of claim 1, wherein at least one algorithm of the library of algorithms requires preprocessing of the two or more sets of microscopic images, the method further comprising:
segmenting the two or more sets of microscopic images to identify at least one of cell nuclei and cells to produce respectively nuclear and cell masks; and
preprocessing the two or more sets of microscopic images using the at least one of nuclear and cell masks to identify images for feature evaluation by the at least one algorithm of the library of algorithms.

4. The method of claim 1, further comprising:
associating each of the two or more sets of microscopic images with a selected well plate of two or more well plates;
comparing quantified feature measurements for each one of the two or more sets of microscopic images that are associated with the same well plate of the two or more well plates;
for each well plate of the two or more well plates, identifying a respective subset of the library of algorithms that discriminate at least two of the two sets or more microscopic images; and
identifying the subset of the library of algorithms based on feature discrimination for the selected biological cell assay by including those particular feature algorithms that appear in at least a first threshold proportion of the respective subsets of library of algorithms for each well plate.

5. The method of claim 4, further comprising:
for each well plate: (i) correlating two of the respective subset of the library of algorithms having a common morphology; and (ii) removing one of the two of the subset having the common morphology from a respective correlation subset of the library of algorithms;
identifying a correlation subset of the library of algorithms for the selected biological cell assay by including those particular feature algorithms that appear in at least a second threshold proportion of the respective correlation subsets of library of algorithms for each well plate; and
including particular feature algorithms in the subset of the library of algorithms based on being in both the correlation subset and the subset based on feature discrimination.

6. The method of claim 5, wherein identifying the correlation subset of the library of algorithms for the selected biological cell assay comprises, for each particular feature:
counting the number of plates in which the particular feature is determined to be statistically significant; and determining a percentage of the count of the number of plates to a total number of the plates; and comparing the percentage to the second threshold that comprises a significant percentage of the plates.

7. The method of claim 6, wherein the second threshold comprises 90% of the plates.

8. The method of claim 1, wherein, for each set of microscopic images, executing the library of algorithms comprises evaluating at least 11,000 image features for each cell in each site.

9. A high performance computing (HPC) system comprising:
a memory containing:
two or more sets of microscopic images of respective sites of selected biological cell assay, each set of microscopic images comprises one or more images having an aggregate field of view sufficient to encompass all of the cells within the respective site and a resolution sufficient to image cellular bodies within each of encompassed cells; and
a library of algorithms that evaluate image features; and
a processor subsystem in communication with the memory to execute a customized cell assay feature test utility to cause the computing system to perform functionality to:
for each microscopic image, execute a library of algorithms that evaluate image features for each cell in each site producing a quantified feature measurement for each cell;
compare quantified feature measurements for each cell for each one of the two or more sets of microscopic images;
identify a subset of the library of algorithms that discriminate at least two of the two or more sets of microscopic images; and
deploy the subset of the library of algorithms as a computer program product for evaluating additional biological cell assays that are similar to the selected biological cell assay,
wherein the customized cell assay feature test utility enables the computing system to:
identify the subset of the library of algorithms comprises performing the Kolmogorov-Smirnov (KS) test for each quantified feature measurement;
correlate two of the subset of the library of algorithms having a common morphology; and
remove one of the two of the subset having the common morphology to reduce redundant computational overhead for downstream execution of the deployed subset of the library of algorithms and to prevent over emphasizing results of correlated features that diminish results of other features.

10. The HPC system of claim 9, wherein the customized cell assay feature test utility enables the computing system to remove the one of the two of the subset by executing a fast correlation-based filter algorithm.

11. The HPC system of claim 9, wherein at least one algorithm of the library of algorithms requires preprocessing of the two or more sets of microscopic images, the customized cell assay feature test utility enables the computing system to:
segment the two or more sets of microscopic images to identify at least one of cell nuclei and cells to produce respectively nuclear and cell masks; and
preprocess the two or more sets of microscopic images using the at least one of nuclear and cell masks to identify images for feature evaluation by the at least one algorithm of the library of algorithms.

12. A computing system comprising:
a high performance computing (HPC) system comprising:
a memory containing:
two or more sets of microscopic images of respective sites of selected biological cell assay, each set of microscopic images comprises one or more images having an aggregate field of view sufficient to encompass all of the cells within the respective site and a resolution sufficient to image cellular bodies within each of encompassed cells; and
a library of algorithms that evaluate image features; and
a processor subsystem in communication with the memory to execute a customized cell assay feature test utility to cause the computing system to perform functionality to:
for each microscopic image, execute a library of algorithms that evaluate image features for each cell in each site producing a quantified feature measurement for each cell;
perform the Kolmogorov-Smirnov (KS) test for each quantified feature measurement to determine effectivity of each algorithm in evaluating the two or more sets of microscopic images,
identify a subset of the library of algorithms that discriminate at least two of the two or more sets of microscopic images filtering based on the KS tests;
correlate two of the subset of the library of algorithms having a common morphology, and
remove one of the two of the subset having the common morphology based on the Pearson coefficient to reduce redundant computational overhead enabling downstream execution of the deployed subset of the library of algorithms and to prevent over emphasizing results of correlated features that diminish results of other features; and
a deployed computing system that executes the subset of the library of algorithms to evaluate additional biological cell assays that are similar to the selected biological cell assay.

* * * * *